July 14, 1959  A. R. BAFFREY ET AL  2,895,034
INDUCTION HEATING APPARATUS
Filed April 4, 1957  4 Sheets-Sheet 1
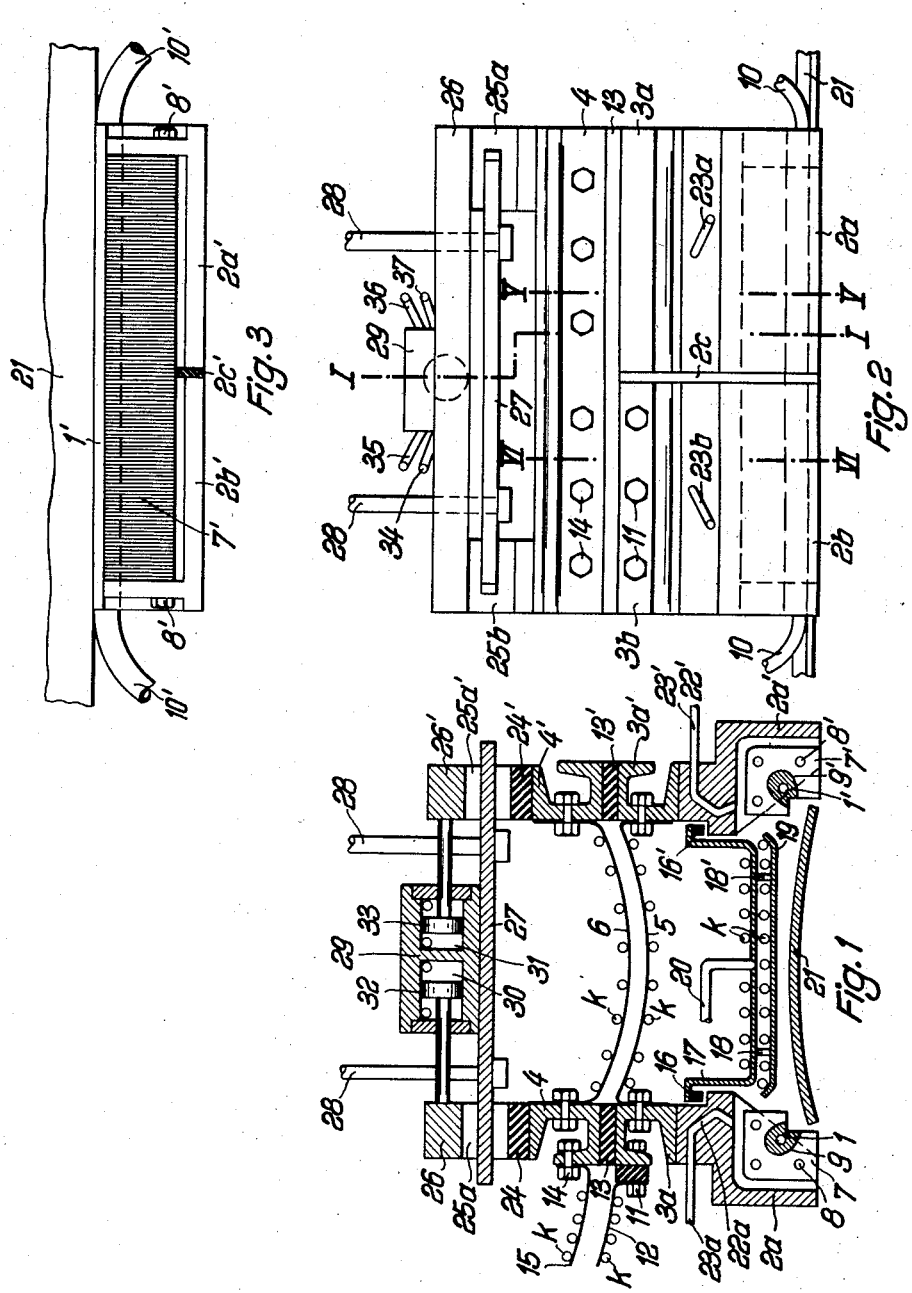
Inventors
Anton Rodolphe Baffrey,
Heinrich Hofmeier,
Wilhelm Schmidt and
Erich Körmann
by: Michael S. Striker

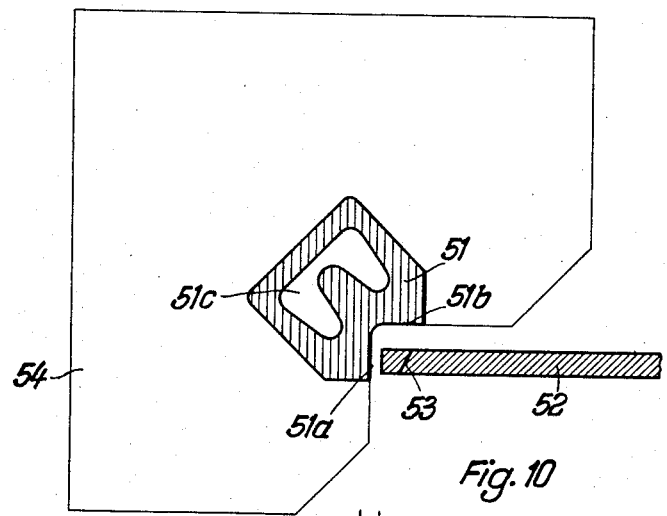
Fig. 10
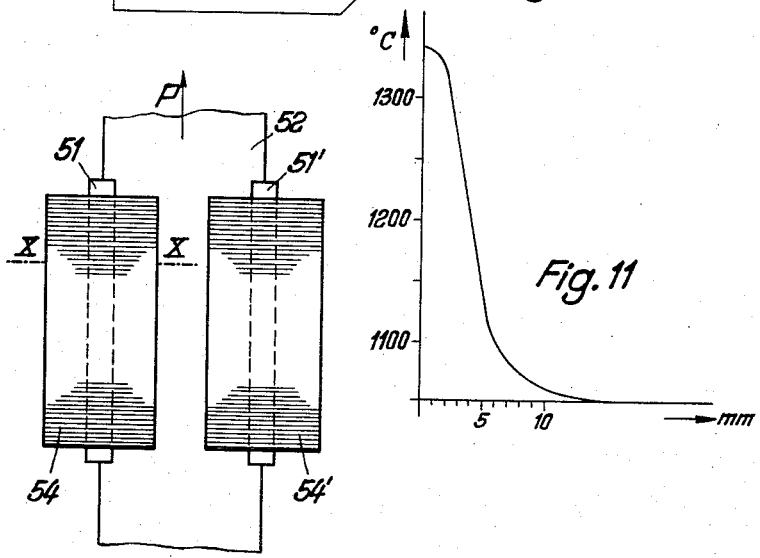
Fig. 11
Fig. 9
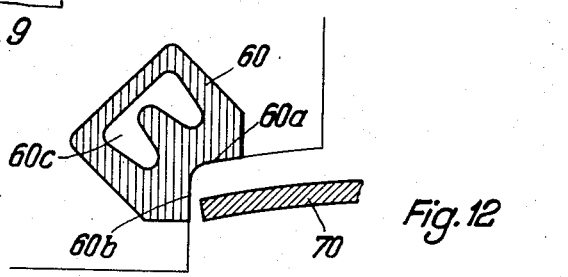
Fig. 12

United States Patent Office 2,895,034
Patented July 14, 1959

2,895,034

INDUCTION HEATING APPARATUS

Anton Rodolphe Baffrey, Liege, Belgium, and Heinrich Hofmeier, Breitscheid, Wilhelm Schmidt, Dinslaken, and Erich Hörmann, Dusseldorf-Eller, Germany, assignors to Phoenix-Rheinrohr Aktiengesellschaft Vereinigte Hütten- und Röhrenwerke, Dusseldorf, Germany, and A.C.E.C. Ateliers de Constructions Electriques de Charleroi, Charleroi, Belgium Application April 4, 1957, Serial No. 650,638

Claims priority, application Germany April 5, 1956

13 Claims. (Cl. 219—8.5)

The present invention relates to induction heaters.

More particularly, the present invention relates to induction heaters which are adapted to form part of a machine for forming a tube from an elongated band by welding together the side edges of the band. In such machine the edges of the band are heated to a relatively high degree and are then pressed together so that they flow into each other to form an elongated tube.

One of the objects of the present invention is to provide an induction heater of the above type which has a higher efficiency than induction heaters which have been used up to the present time.

Another object of the present invention is to provide an induction heater of the above type which is composed of simple and ruggedly constructed elements which are very reliable in operation.

With the above objects in view, the present invention mainly consists of an induction heater for heating the edges of a band moving along the induction heater, this induction heater including a pair of opposed elongated parallel units adapted to be located adjacent to the edges of the band in order to heat these edges. A plurality of electrical conductor means cooperate with these units for leading current to and from as well as within and between the units, and this plurality of electrical conductor means cooperate with each other to maintain their fields in a compensating relationship with respect to each other. A means is provided for laterally adjusting at least one of the units so as to maintain the two units properly spaced in order to heat the edges of a band in a desired manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a transverse sectional view of an induction heater according to the present invention, Fig. 1 being taken along line I—I of Fig. 2;

Fig. 2 is a side elevational view of the induction heater of the invention, Fig. 2 showing the structure as seen from the left side of Fig. 1;

Fig. 3 is a view from below of the right side of the structure shown in Fig. 1;

Fig. 9 is a diagrammatic plan view of a pair of parallel induction heating units;

Fig. 10 is a transverse view on an enlarged scale of one of the units of Fig. 9, Fig. 10 being taken along line X—X of Fig. 9;

Fig. 11 is a diagram showing how the temperature varies in an edge portion of the band shown in Fig. 10; and Fig. 12 shows a slightly different embodiment of the structure of Fig. 10.

Figure 4:
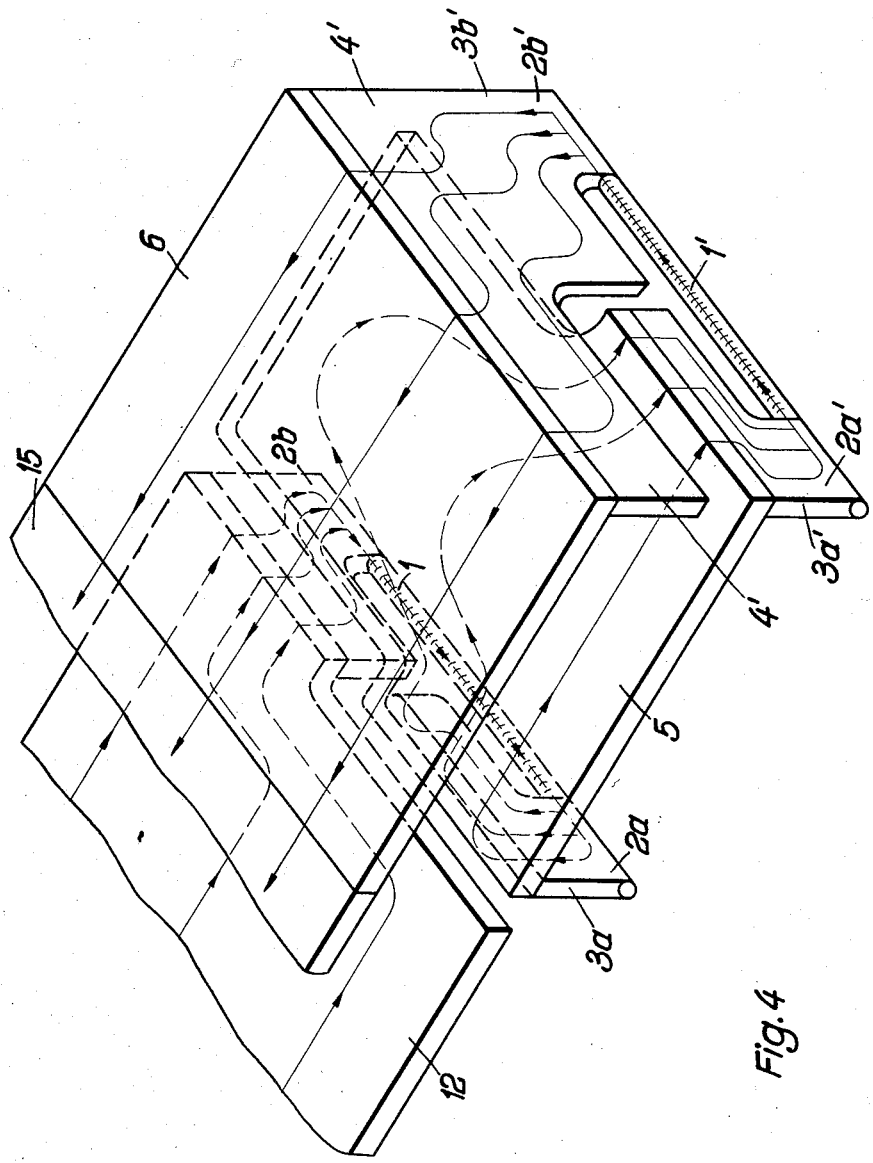
Fig. 4 is a diagrammatic perspective illustration showing the manner in which current flows through the structure of the invention.

Referring to Fig. 1 it will be seen that the structure of the invention includes in the illustrated example a pair of induction heating units respectively including a pair of elongated copper conductors 1 and 1', these conductors being spaced from and parallel to each other and being adapted to be located closely adjacent to the opposed edges of the band 21 whose edges are to be heated. Each unit further includes a series of transformer laminations arranged along and partly surrounding each of the conductors. Thus, as is shown in Fig. 1, the series of laminations 7 are arranged along the conductor 1, while the series of laminations 7' are arranged along the conductor 1'. The series of laminations 7 are held together by an elongated screw means 8, and the series of laminations 7' are held together by an elongated screw means 8'. These two induction heating units are respectively arranged in a pair of housings each of which is composed of two parts.

As may be seen from Fig. 2 the conductor 1 and laminations 7 are arranged in a housing made up of the parts 2a and 2b which are insulated from each other by means of insulation 2c, the parts 2a and 2b being elongated, extending longitudinally of the conductor 1, partly surrounding the laminations 7, and forming a pair of end conductors electrically connected with ends of the conductor 1. The housing which receives the conductor 1' and the laminations 7' is identically constructed, and the elongated housing part 2a' is shown in Fig. 1. The two housing parts 2a' and 2b' are visible in Fig. 3, and as is apparent from Fig. 3 these two housing parts are separated from each other by the electrical insulation 2c'.

Figure 5:
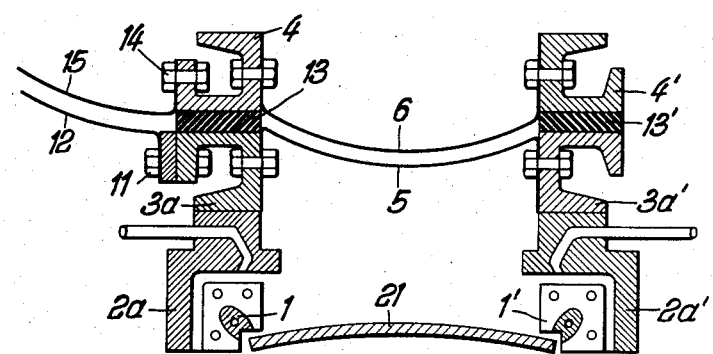
Fig. 5 is a transverse sectional view taken along line V—V of Fig. 2.
Figure 6:
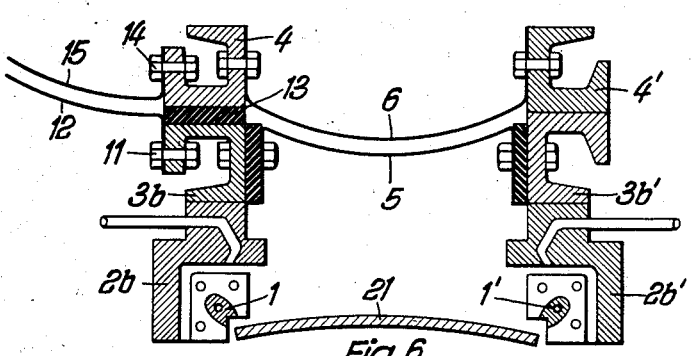
Fig. 6 is a transverse sectional view taken along line VI—VI of Fig. 2.

The elongated conductor 1 is insulated from the laminations 7 by the insulation material 9 while the conductor 1' is insulated from the laminations 7' by the insulation 9'. In the description which follows all of the parts shown at the left of Figs. 1, 5 and 6 are duplicated at the right and are indicated by the same reference characters primed.

The conductor 1 is hollow and is connected to a cooling water supply 10, as is indicated in Fig. 2. The cooling water flows through the conduit 10 and through the hollow conductor 1, this cooling water being circulated in any known suitable way.

The housing part 2a is formed in an upper portion with a passage 22a which empties onto the upper side of the series of laminations 7 and which is connected with a conduit 23a supplied with cooling water so that the cooling water flows from the passage 22a to the upper side of the series of laminations 7. Corresponding passages and cooling water connections are provided in the housing parts 2b, 2a', and 2b'. A carrier 3a is fixed to an upper portion of the housing 2a, and a similar carrier 3b is fixed to the upper face of the housing part 2b. These carriers 3a and 3b are also insulated from each other by the insulation 2c, as is evident from Fig. 2. The rear carrier 3b is provided with electrical connections 11 for electrically connecting the current supply conductor 12 with the carrier 3b, as is indicated in Fig. 1. Similar electrical connections are not provided on the other carriers. A layer of insulation 13 extends along the top face of the carriers 3a and 3b and serve to insulate from the latter another elongated carrier 4 which is provided with electrical connections 14 for an electrical conductor 15, as is shown in Figs. 1, 5, and 6. The parts 11, 12, 14, and 15 are only arranged at the left side of the device.

Thus, the end conductors 2a, 2b, 2a', and 2b' form two pairs of opposed end conductors, and a copper sheet 5 is electrically connected with the pair of opposed carriers 3a and 3a' so as to electrically interconnect the pair of opposed end conductors 2a and 2a'. The copper sheet 5 is flexible and hangs downwardly. This sheet 5 is yieldable enough to permit the space between the left and right induction heating units to be adjusted. The upper carrier 4 is electrically connected with the opposed carrier 4' by a similar copper sheet 6. The front carrier member 3a' is insulated from the carrier 4' by means of insulation 13', as is shown in Fig. 5. It will be noted that the rear elongated carrier 3b' shown in Fig. 6 is electrically connected with the end conductor 2b' and the elongated carrier member 4'.

An elongated screening sheet 17 (Fig. 1) extends longitudinally between the pair of housings 2a, 2b and 2a', 2b', strips of insulation 16 and 16' serving to connect the screening sheet 17 with these housings. A pair of downwardly extending strips 18 and 18' are fixed to and extend downwardly from the sheet 17 and these strips 18 and 18' are fixed with a lower screening sheet 19 so that the sheets 17 and 19 together with the strips 18 and 18' form an elongated hollow space, the strips 18 and 18' being provided with openings so that the space communicates with the exterior of the screening sheets. A tube 20 is connected to the sheet 17 and communicates with the hollow space between the latter and the sheet 19 to provide a supply of air to this space. The parts 17—20 are made of non-magnetic material such as aluminum or a chrome-nickel steel having a relatively large amount of chrome-nickel, or the like. The side edges of the sheet 19 are curved upwardly in the manner shown in Fig. 1 and cooperate with the edges of the horizontal portion of the sheet 17 to provide with the latter elongated nozzles through which the air flows after moving out of the hollow space defined by parts 17—19. These nozzles direct the air to the spaces between the housings 2a, 2b and 2a', 2b', and the series of laminations 7 and 7', respectively. Thus, the air flowing from the space between the screening sheets 17 and 19 serves to cool the laminations 7 and 7' as well as to prevent the cooling water flowing along these laminations from falling onto the edges of the band 21 which are to be heated by the conductors 1 and 1'.

The electrical conductors 12 and 15 as well as the electrical connecting elements 5 and 6 are in the form of relatively wide copper sheets. In order to cool these sheets copper tubes k are soldered to at least one face of each sheet and extend in a tortuous path over each sheet. Thus, when cooling water or the like flows through the copper tubing k the sheets will be intensively cooled. It will be noted that the screening sheets 17 and 19 are also cooled with similar tubing k.

A pair of guide blocks 25a and 25b are respectively located over the ends of the elongated carrier member 4 and are fixed to the latter while being insulated therefrom by the layers of insulation 24, and a similar pair of blocks 25a' and 25b' are located over the ends of the elongated carrier 4' and are insulated therefrom by the layers of insulation 24'. An elongated bar 26 extends between and interconnects the blocks 25a and 25b with each other, and a similar bar 26' extends between and interconnects the blocks 25a' and 25b' with each other. A stationary base plate 27 carries the above-described structure and is connected with an unillustrated machine frame by the members 28. The ends of the plate 27 extend into grooves formed in the guide blocks 25a, 25b, 25a', and 25b', so that the plate 27 cooperates with these blocks to guide the structure at the left and right of Figs. 1, 5 and 6 for transverse movement with respect to the direction of movement of the band 21. In the illustrated example this lateral movement of the induction heating units at each side of the device is brought about hydraulically. Thus, a housing 29 carried by the plate 27 is provided with a pair of cylinders 30 and 31 in which a pair of pistons 32 and 33 are respectively slidable (Fig. 1). The piston rods of the pistons 32 and 33 are respectively fixed to the elongated bars 26 and 26', so that as the pistons slide in their cylinders the units at the right and left will be adjusted. Oil is moved to and from the cylinders for shifting the pistons therein, and the oil conduits 34—37 are indicated in Fig. 2 and the ends of these conduits are shown diagrammatically in Fig. 1. A suitable valve structure which is automatically operated in a manner described below is provided to cause the oil to flow within these conduits in a direction which produces the desired movement of the pistons. Thus, the left and right units may be independently adjusted or they may be adjusted together. The control of the adjusting structure can be carried out in any suitable way, as, for example, by a mechanical drive.

The above-described heating units are provided with the electrical conductor means described above and further described below, and the plurality of electrical conductor means cooperate with the induction heating units to supply electricity to the latter as well as to lead electricity from the latter and between the units, and furthermore this plurality of electrical conductor means cooperate with each other to maintain their fields in a compensating relationship with respect to each other, as is particularly apparent from Figs. 4–6. In Fig. 4 the direction of flow of the current is indicated by the arrows in a schematic perspective illustration in which for the sake of clarity many of the details shown in Figs. 1, 5, and 6 are omitted. Referring to Fig. 4 it will be seen that the current supply sheet 12 is connected electrically with the rear end conductor 2b of the left unit. From the conductor 2b the current flows through the elongated conductor 1 to the opposite end conductor 2a, and from the latter the current flows through the sheet 5 which is connected electrically with the opposite end conductor 2a', so that in this way the sheet 5 serves to electrically interconnect the left and right induction heating units. It will be noted that the sheet 5 extends along the entire length of the units and has a width substantially equal to the space between the units. The current flows from the end conductor 2a' of the right unit along the conductor 1' to the rear end conductor 2b' of this unit, and from the conductor 2b' the current flows along the upper sheet 6 and to the conductor 15 which carries the current away from the device. The sheet 6 is electrically connected with the elongated members 4 and 4' and is substantially coextensive with and located over the sheet 5, the sheet 6 being parallel to the sheet 5 and being cooled by the tubing k, as is indicated in Fig. 1. The conductors 12 and 15 are also in the form of flexible sheets, and the conductor 15 is substantially coextensive with and covers the conductor 12 while the conductor 6 is coextensive with and covers the conductor 5. The device operates under alternating current. Therefore the operation described in connection with Fig. 4 is only for a half cycle.

Figures 7, 8:
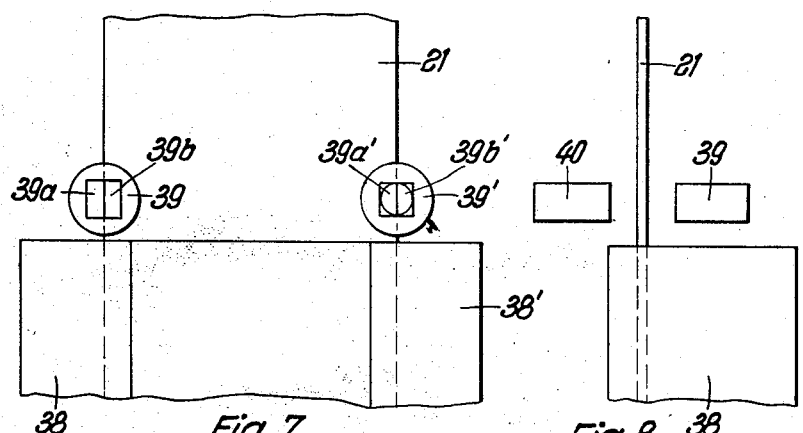
Fig. 7 is a diagrammatic plan view showing an electro-optical device for controlling an adjusting structure of the invention.
Fig. 8 is a side elevational view of the electro-optical control structure.

In order to uniformly heat the edges of the band 21 it is important that the conductors 1 and 1' be uniformly spaced from the opposed edges of the band 21, respectively. In order to automatically maintain the proper spacing of the conductors 1 and 1' respectively from the edges of the band 21 and electro-optical control device illustrated in Figs. 7 and 8 is provided. This control structure is arranged in the immediate vicinity of the above-described structure just in front of the pair of units to which the band 21 moves, the two units being shown at 38 and 38' in Fig. 7. The control structure is supported in any suitable way and includes a pair of receivers 39 and 39' located over the opposed edges of the band 21 and receiving light from a pair of light sources 40 and 40', respectively. Each of the receivers 39 and 39' is composed, for example, of a pair of photoelectric cells located beside each other. Thus, Fig. 7 shows the pair of cells 39a and 39b of the receiver 39 as well as the cells 39a' and 39b' of the receiver 39'. The pair of cells of each receiver are separated from each other along a line which is parallel to the edge of the band 21 beneath each receiver. In order to exclude from the receivers light which radiates from the edges of the band 21 a modulated light source may be used for the control structure. The photocells are interconnected in a known way with the above-described hydraulic structure for automatically controlling the movement of the pistons 32 and 33 in accordance with the exposure of the photocells to light from the sources 40 so that the left and right units 38 and 38' are automatically moved, when necessary, so as to maintain the opposed edges of the band 21 directly in line with the lines separating the pair of photocells of the receivers, respectively. Thus, the separation lines between the pair of photocells of the receivers are automatically maintained in precise alignment with the edges of the band 21. With the above-described structure both of the units 38 and 38' can be independently moved so as to accommodate any changes in the width of the band 21 as well as any lateral shifting thereof.

Instead of providing independent light sources for the receivers 39 and 39', receivers may be used which react to light radiating from the edges of the bands. When the width of the band 21 varies only to a slight extent, the provision of automatic opposed controls for both units may be omitted and only one unit may be adjusted, if desired.

Instead of an electro-optical control structure as described above, a different type of control device may be used.

With the above-described structure it is possible to maintain the conductors 1 and 1' uniformly at an extremely small unchanging distance from the edges of the band 21, respectively, so that it is possible to operate the device at a very high efficiency.

Figs. 9–12 illustrate a construction of the elongated conductors 1 and 1' which is particularly suitable for providing a large amount of heat in a very narrow edge portion of the band. In Figs. 9–12 the elongated conductors which correspond to the conductors 1 and 1' are indicated at 51 and 51', respectively. Except for the differences described below the structure of Figs. 9–12 is identical with that described above.

With the structure of Figs. 9–12 it is possible to provide heating of several hundred degrees in a zone which at a maximum is not wider than a few millimeters. Each of the elongated heating conductors 51 and 51' is provided with a pair of elongated free surfaces directed toward the edge to be heated and these surfaces are located at an angle from each other, the lines of flux extending from these surfaces of the conductors. One of the surfaces of each conductor is substantially parallel to an edge surface of the band 21 and the other surface of each conductor is located over the top face of the band 21 adjacent to the edge surface thereof, and this upper downwardly directed free surface of each conductor may be spaced from the band by a greater distance than the side surface of the conductor which is directed toward the edge surface of the band.

The above-referred to band 21 is shown at 52 in Figs. 9 and 10. This band, which is to be formed into a tube, moves in the direction of the arrow P in Fig. 9 between the pair of elongated conductors 51 and 51', the conductor 51 being shown in section on an enlarged scale in Fig. 10, and the conductor 51' having the same construction and being a mirror image of the conductor 51. The conductor 51 is made out of an elongated bar of copper which has adjacent the edge of the band 52 the pair of free surfaces 51a and 51b which make substantially a right angle with each other. A cooling fluid may flow through the interior hollow space 51c of the elongated copper bar 51. Each of the bars 51 and 51' is partly surrounded by a series of laminations 54 and 54', respectively. The structure shown in Figs. 9 and 10 is supported and provided with electricity in the same way as the above-described structure of Figs. 1–8.

The space between the elongated surface 51a and the edge surface of the band 52 toward which the surface 51a is directed is extremely small and is equal approximately to one millimeter or only slightly more than one millimeter. On the other hand, the distance between the surface 51b and the upper face of the band 52 is greater. This distance is preferably a few millimeters. With such an arrangement a very good temperature distribution is obtained when the device operates at a good efficiency, the temperature distribution being shown graphically in Fig. 11 which indicates the magnitude of the temperature over the width of the edge portion in millimeters. The temperature distribution within the sheet 52 is indicated by the isotherm line 53 in Fig. 10, and in accordance with Fig. 11 it will be seen that the temperature is approximately 1350° C. Such a temperature distribution is highly satisfactory for welding together the edges of the band in order to form a tube therefrom.

By changing the position of the conductor 51 or by providing the latter with a different cross section it is possible to provide a different temperature distribution which may be desirable in certain cases for the further working of the band. Fig. 12 shows an arrangement which is suitable for heating the edge of a band which is transversely curved so that it has an upper convex face and a lower concave face. The elongated conductor 60 shown in Fig. 12 corresponds to the conductor 51 and is provided with a pair of free surfaces 60a and 60b which are directed toward the band and which are at an angle to each other which is somewhat greater than a right angle. Otherwise the structure of Fig. 12 is identical with that of Fig. 10. The band 70 in Fig. 12 corresponds to the band 52, and Fig. 12 shows the hollow space 60c within the conductor 60 for receiving cooling water or the like. Except for the difference between the angles provided between the elongated surfaces of the conductors of Figs. 10 and 12, these conductors are identical.

The above-described structure of Figs. 10 and 12 presents the advantage that they may be easily raised upwardly from the band and in this way the operations performed on the band may be regulated. Furthermore, with this arrangement any scale which forms can fall freely.

It will be understood that each of the elements described above, or two or more together, may also find a useful application in other types of induction heaters differing from the types described above.

While the invention has been illustrated and described as embodied in induction heaters for use in machines which form tubes from elongated bands, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an induction heater for heating the edge portions of a band moving along the heater, in combination, a pair of opposed induction heating units parallel to and spaced from each other and adapted to be located closely adjacent to the band edges which are to be heated, each heating unit having an elongate conductor member partially surrounded by a laminated core along a substantial portion of the length thereof; a plurality of electrical conductor means cooperating with said units for electrically connecting the same in series with each other, for conducting electricity to and from and within said units, and said plurality of conductor means cooperating with each other for maintaining their fields in compensating relationship with respect to each other, and an end conductor member for each end of the elongate conductor member and partially surrounding the laminated core, said end conductor members having a combined length substantially equal to that of the core.

2. In an induction heater for heating the edge portions of a band moving along the heater, in combination, a pair of opposed induction heating units parallel to and spaced from each other and adapted to be located closely adjacent to the band edges which are to be heated; and a plurality of electrical conductor means cooperating with said units for electrically connecting the same in series with each other, for conducting electricity to and from and within said units, and said plurality of conductor means cooperating with each other for maintaining their fields in compensating relationship with respect to each other, said units defining between themselves a space through which the band moves during heating of the edges thereof, and said plurality of conductor means including a pair of substantially coextensive electrically conductive sheets located one above the other over said space, each of said sheets extending along the entire length of said units and having a substantially constant width substantially equal to the distance between said units.

3. In an induction heater for heating the edge portions of a band moving along the heater, in combination, a pair of opposed induction heating units parallel to and spaced from each other and adapted to be located closely adjacent to the band edges which are to be heated; a plurality of electrical conductor means cooperating with said units for electrically connecting the same in series with each other, for conducting electricity to and from and within said units, and said plurality of conductor means cooperating with each other for maintaining their fields in compensating relationship with respect to each other, said units defining between themselves a space through which the band moves during heating of the edges thereof, and said plurality of conductor means including a pair of substantially coextensive electrically conductive sheets located one above the other over said space, each of said sheets extending along the entire length of said units and having a substantially constant width substantially equal to the distance between said units; and conduit means joined to at least one face of each sheet for conducting cooling water through the conduit means for cooling each sheet.

4. In an induction heater for heating the edge portions of a band moving along the heater, in combination, a pair of opposed induction heating units parallel to and spaced from each other and adapted to be located closely adjacent to the band edges which are to be heated; and a plurality of electrical conductor means cooperating with said units for electrically connecting the same in series with each other, for conducting electricity to and from and within said units, and said plurality of conductor means cooperating with each other for maintaining their fields in compensating relationship with respect to each other, said units defining between themselves a space through which the band moves during heating of the edges thereof, and said plurality of conductor means including a pair of substantially coextensive electrically conductive sheets located one above the other over said space, each of said sheets extending along the entire length of said units and having a substantially constant width substantially equal to the distance between said units, each sheet being made of copper and being bendable transversely with respect to the movement of a band between said units.

5. In an induction heater for heating the edge portions of a band moving along the heater, in combination, a pair of opposed induction heating units parallel to and spaced from each other and adapted to be located closely adjacent to the band edges which are to be heated; a plurality of electrical conductor means cooperating with said units for electrically connecting the same in series with each other, for conducting electricity to and from and within said units, and said plurality of conductor means cooperating with each other for maintaining their fields in compensating relationship with respect to each other, said units defining between themselves a space through which the band moves during heating of the edges thereof, and said plurality of conductor means including a pair of substantially coextensive electrically conductive sheets located one above the other over said space, each of said sheets extending along the entire length of said units and having a substantially constant width substantially equal to the distance between said units, each sheet being made of copper and being bendable transversely with respect to the movement of a band between said units; and copper conduit means joined to at least one face of each sheet for conducting a cooling medium through said conduit means for cooling each sheet.

6. In an induction heater, in combination, a pair of elongated electrical conductors spaced from and parallel to each other and adapted to be located adjacent the edges of a band whose edge portions are to be heated; a series of laminations arranged along each of said elongated conductors and at least partly surrounding the same; a pair of elongated end conductors electrically insulated from each other and connected with end portions of each of said elongated conductors, extending longitudinally of the same, and at least partly surrounding said laminations, the end conductors connected with one of said elongated conductors being respectively located opposite the end conductors connected with the other of said elongated conductors to provide two pairs of opposed end conductors; a flexible electrically-conductive sheet extending between and electrically connected with one of said pairs of opposed end conductors, said sheet having a length substantially equal to that of each of said elongated conductors and having a width substantially equal to the space between said elongated conductors; electrically conductive means connected electrically with one of the other of said pair of opposed end conductors for supplying current thereto; and second electrically conductive means connected electrically with the other of said other pair of opposed end conductors for leading current away from the latter, said second electrically conductive means including an electrically conductive electrical sheet substantially coextensive with said first-mentioned sheet, being substantially parallel thereto, and located thereover.

7. In an induction heater, in combination, a pair of elongated parallel conductors spaced from each other adapted to be located closely adjacent to the opposed edges of a band whose edges are to be heated a laminated core having a series of laminations arranged along each of said elongated conductors and at least partly surrounding the latter; means for supplying cooling water to said laminations to flow therealong; screen means located over the space between said elongated conductors, said screen means being hollow and having openings directed toward said laminations; and means for supplying cooling air to the interior of said hollow screen means, so that the air flows through said openings toward said laminations and transversely over said core to prevent the cooling water flowing therealong from engaging a band between said pair of elongated conductors.

8. In an induction heater for heating the opposed edge portions of an elongated band while the latter moves longitudinally with respect to the heater, in combination, a pair of elongated parallel spaced induction units adapted to be located respectively adjacent to the band edges for heating the latter; adjusting means operatively connected to both of said units for laterally adjusting the latter in accordance with the distance between the edges of the band whose edges are being heated; and electro-optical means for sensing the edges of the band, said electro-optical means being operatively connected to said adjusting means for controlling the latter to locate automatically said units in a proper position with respect to the edges of the band.

9. In an induction heater, in combination, a pair of opposed, elongated, parallel induction units adapted to be located closely adjacent to the edges of a band whose edge portions are to be heated, each of said units including elongated conductor means for heating an edge portion of the band having a width of only a few millimeters through several hundred degrees, each of said elongated conductor means having a pair of elongated surfaces constituting an angle with each other and respectively directed toward a lateral edge surface of the band and toward a face of the band adjacent said edge surface, said surface of said conductor means being directed toward said edge surface of the band being substantially parallel to said edge surface, with the addition that said elongated conductor is in the form of a hollow conduit adapted to have cooling liquid pass therethrough, and having an internal correspondingly elongated rib disposed substantially at the apex portion of said angle.

10. In an induction heater, in combination, a pair of opposed, elongated, parallel induction units adapted to be located closely adjacent to the edges of a band whose edge portions are to be heated, each of said units including elongated conductor means for heating an edge portion of the band having a width of only a few millimeters through several hundred degrees, each of said elongated conductor means having a pair of elongated surfaces making an angle with each other and respectively directed toward an edge surface of the band and a face of the band adjacent said edge surface, said surface of said conductor means directed toward said edge surface of said band being substantially parallel to said edge surface.

11. In an induction heater, in combination, a pair of opposed, elongated, parallel induction units adapted to be located closely adjacent to the edges of a band whose edge portions are to be heated, each of said units including elongated conductor means for heating an edge portion of the band having a width of only a few millimeters through several hundred degrees, each of said elongated conductor means having a pair of elongated surfaces making an angle with each other and respectively directed toward a lateral edge surface of the band and toward a face of the band adjacent said edge surface, said surface of said conductor means directed toward said edge surface of said band being substantially parallel to said edge surface, and said elongated surfaces of said conductor means making substantially a right angle with each other the bisecting line of said angle being inclined at an angle relative to the plane of the band.

12. In an induction heater, in combination, a pair of opposed, elongated, parallel induction units adapted to be located closely adjacent to the edges of a band whose edge portions are to be heated, each of said units including elongated conductor means for heating an edge portion of the band having a width of only a few millimeters through several hundred degrees, each of said elongated conductor means having a pair of elongated surfaces making an angle with each other and respectively directed toward an edge surface of the band and a face of the band adjacent said edge surface, said surface of said conductor means directed toward said edge surface of said band being substantially parallel to said edge surface, said elongated surface of said conductor means which is directed toward said face of said band extending from an upper edge of said surface of said conductor means which is directed toward said edge surface of said band and the distance between said edge surface of said band and said surface of said conductor means directed toward the same being substantially less than the distance between said face of said band and the surface of said conductor means directed toward said face.

13. An inductor heater for heating the longitudinal edge portions of a band moving longitudinally along the heater, comprising, in combination, a pair of opposed inductor heating units parallel to and spaced from each other and adapted to be located closely adjacent to the edges of the band to effect localized heating thereof, each heating unit having an elongate conductor member partially surrounded by a laminated core along a substantial portion of the length of the elongate conductor member, and an end conductor member for each end of each elongate conductor member and partially surrounding the respective laminated core, the end conductor members for each heating unit having endwise abutting relationship to each other with a layer of insulating material interposed between the abutting faces of said members.

References Cited in the file of this patent
UNITED STATES PATENTS

| | | |
|---|---|---|
| 1,912,214 | Northrup | May 30, 1933 |
| 2,632,840 | Sorensen | Mar. 24, 1953 |
| 2,666,831 | Seulen et al. | Jan. 19, 1954 |
| 2,673,274 | Vaughan et al | Mar. 23, 1954 |
| 2,762,892 | Park | Sept. 11, 1956 |

FOREIGN PATENTS

| | | |
|---|---|---|
| 758,898 | Great Britain | Oct. 10, 1956 |